United States Patent
Cheng

(10) Patent No.: US 12,535,907 B2
(45) Date of Patent: Jan. 27, 2026

(54) TOUCH CONTROL SYSTEM AND TOUCH CONTROL METHOD

(71) Applicant: DARWIN PRECISIONS CORPORATION, Hsinchu County (TW)

(72) Inventor: Chih-Ying Cheng, Hsinchu County (TW)

(73) Assignee: DARWIN PRECISIONS CORPORATION, Hsinchu County (TW)

( * ) Notice: Subject to any disclaimer, the term of this patent is extended or adjusted under 35 U.S.C. 154(b) by 0 days.

(21) Appl. No.: 18/375,558

(22) Filed: Oct. 2, 2023

(65) Prior Publication Data

US 2024/0310941 A1 Sep. 19, 2024

(30) Foreign Application Priority Data

Mar. 17, 2023 (TW) .................................. 112110028

(51) Int. Cl.
*G06F 3/041* (2006.01)
(52) U.S. Cl.
CPC .................................. *G06F 3/0416* (2013.01)
(58) Field of Classification Search
None
See application file for complete search history.

(56) References Cited

U.S. PATENT DOCUMENTS

| | | | | |
|---|---|---|---|---|
| 9,760,241 | B1* | 9/2017 | Lewbel | G06F 1/1684 |
| 2018/0059866 | A1* | 3/2018 | Drake | G06F 3/0446 |
| 2022/0147176 | A1* | 5/2022 | Park | G06F 3/0416 |

FOREIGN PATENT DOCUMENTS

| | | |
|---|---|---|
| CN | 106155417 A | 11/2016 |
| CN | 109992161 A | 7/2019 |
| CN | 111522498 A | 8/2020 |
| TW | I545496 B | 8/2016 |
| TW | I762007 B | 4/2022 |
| TW | I769739 B | 7/2022 |

* cited by examiner

*Primary Examiner* — Lisa S Landis

(57) ABSTRACT

Disclosed are a touch control system and a touch control method. The touch control method is applicable to the touch control system. The touch control system includes: a touch control sensing module, including a touch control region configured to acquire a contact area, the contact area including a first contact area and a second contact area; and a processing unit, connected to the touch control sensing module and configured to execute a control program and transmit a control instruction to a controlled module. The control program includes: acquiring the first contact area at a first time point; acquiring the second contact area at a second time point after the first time point; and transmitting the control instruction based on area sizes of the first contact area and the second contact area in the touch control region.

14 Claims, 3 Drawing Sheets

TOUCH CONTROL SYSTEM AND TOUCH CONTROL METHOD

FIELD OF THE INVENTION

The present disclosure relates to a touch control system and a touch control method, and more particularly to a touch control system and touch control method that may transmit a control instruction based on a contact area during touch control.

BACKGROUND OF THE INVENTION

In the prior art, a touch operation of a touch control system may generally be, for example, to tap virtual keys in a user interface (UI) with a finger, and a press position of the finger is determined in combination with software to achieve functions required by the touch control system.

In the touch control system, a user may carry out the touch operation via the user interface, and achieve the functions of adjusting the volume, changing the backlight brightness of a screen, changing a channel, rotating the screen with two fingers and so on by touching non-physical keys.

However, in the prior art, the above keys are generally assigned with single function. Taking the case of adjusting the volume as an example, when the user touches a key with the function of increasing the volume, the user must press the key several times to turn the volume from the minimum to the maximum. Repeated and redundant operations are required in the operation process, and besides, it takes a lot of time to adjust the volume to the desired level.

Thus, in the prior art, the touch control system has the problems of single key function, long operation time, repeated execution of the same operation, and so on.

SUMMARY OF THE INVENTION

In view of this, the present disclosure provides a touch control system and a touch control method. Due to the fact that, for example, during pressing with a finger, contact areas of the finger may be different due to the different degree of pressing at a first time point and a second time point, the touch control system according to the present disclosure may acquire a first contact area generated when a user touches a touch control region with, for example, a finger for touch control at the first time point (for example, a first moment when the user touches a sensor), acquire a second contact area at a second time point (for example, any time point from the beginning of finger pressing to complete pressing) after the first time point, and then transmit a control instruction to a controlled module based on area sizes of the first contact area and the second contact area in the touch control region. Thus, under the condition that the area of the touch control region of the touch control system according to the present disclosure is fixed, touch control response regions (for example, virtual keys) may be given more functional applications. Moreover, as repeated operations are not required, the present disclosure may effectively improve the use experience of users.

A touch control system according to the present disclosure includes: a touch control sensing module, including a touch control region configured to acquire a contact area, the contact area including a first contact area and a second contact area; and a processing unit, connected to the touch control sensing module and configured to execute a control program and transmit a control instruction to a controlled module. The control program includes: acquiring the first contact area at a first time point; acquiring the second contact area at a second time point after the first time point; and transmitting the control instruction based on area sizes of the first contact area and the second contact area in the touch control region.

According to one embodiment of the present disclosure, the above-mentioned touch control system further includes: a displaying module, connected to the processing unit and configured to indicate a touch control reference mark.

According to one embodiment of the present disclosure, the control program of the above-mentioned touch control system further includes: calculating a contact position based on a contact surface.

According to one embodiment of the present disclosure, the touch control sensing module of the above-mentioned touch control system includes a plurality of touch control response regions, and the touch control system further includes: a displaying module, connected to the processing unit and configured to indicate the plurality of touch control response regions; and the control program further includes: transmitting the control instruction based on a touch sequence of the plurality of touch control response regions.

According to one embodiment of the present disclosure, the above-mentioned touch control system further includes: a communication module, connected to the processing unit and configured to be in communication connection with the controlled module.

A touch control method according to the present disclosure is applicable to a touch control system; the touch control system includes a touch control sensing module, a processing unit, and a controlled module; and the touch control method includes: acquiring a first contact area at a first time point; acquiring a second contact area at a second time point after the first time point; and transmitting a control instruction to the controlled module based on area sizes of the first contact area and the second contact area in a touch control region.

According to one embodiment of the present disclosure, in the above-mentioned touch control method, the touch control system further includes: a displaying module, connected to the processing unit and configured to indicate a touch control reference mark.

According to one embodiment of the present disclosure, the above-mentioned touch control method further includes: calculating a contact position based on a contact surface.

According to one embodiment of the present disclosure, the above-mentioned touch control method further includes: transmitting the control instruction based on a touch sequence of a plurality of touch control response regions.

In summary, as the touch control system and the touch control method according to the present disclosure may transmit the control instruction to the controlled module based on area sizes of the first contact area and the second contact area, under the condition that the area of the touch control region of the touch control system according to the present disclosure is fixed, the touch control response regions (for example, virtual keys) may be given more functional applications. Moreover, as repeated operations are not required, the present disclosure may effectively improve the use experience of users, and the users may use the touch control system quickly and efficiently and may perform various operations with a single finger.

Other objectives, features and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF PREFERRED EMBODIMENTS

Firstly, the functional architecture of the present disclosure is described.

Figure 1:
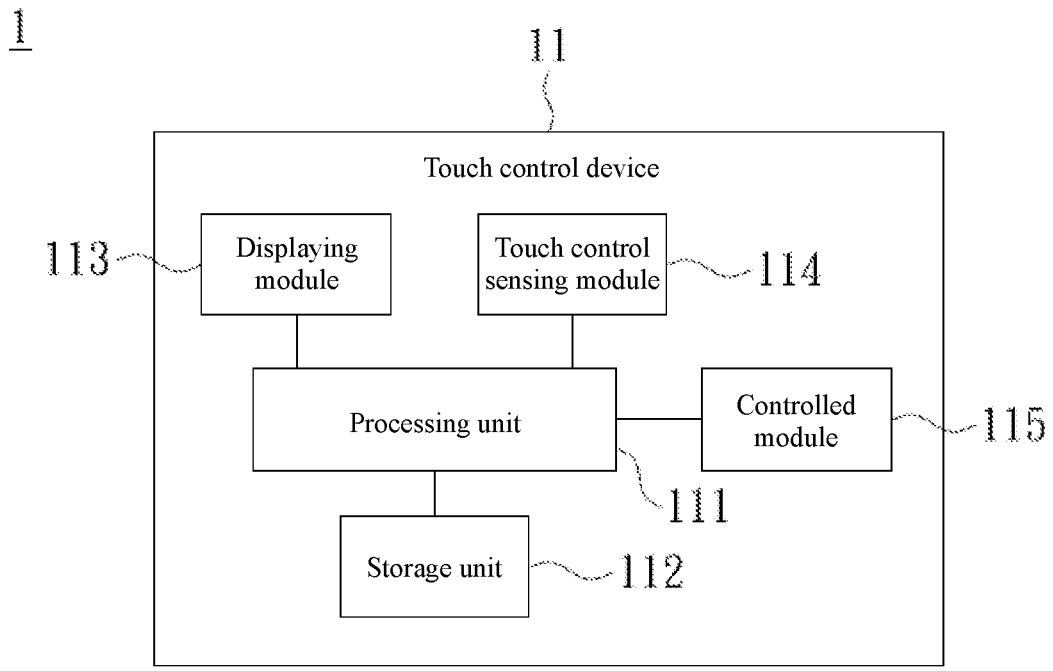
FIG. 1 is a block diagram of a touch control system according to an embodiment of the present disclosure.

Referring to FIG. 1, FIG. 1 is a block diagram of a touch control system 1 according to an embodiment of the present disclosure.

In this embodiment, the touch control system 1 according to the present disclosure is applied to a touch control device 11. The touch control device 11 includes: a processing unit 111, a storage unit 112, a displaying module 113, a touch control sensing module 114, and a controlled module 115. The processing unit 111 is connected to the storage unit 112, the displaying module 113, the touch control sensing module 114, and the controlled module 115.

In this embodiment, the touch control sensing module 114 of the present disclosure includes a touch control region. The touch control region may be configured to detect, for example, a touch control behavior of a user, and acquire a contact area through a contact surface formed by, for example, a contact position between a finger and the touch control region. The contact area may include a first contact area and a second contact area. The first contact area and the second contact area are respectively used for representing contact areas detected by the touch control sensing module 114 at different time points under the same touch control behavior of the user. The processing unit 111 may execute a control program stored in the storage unit 112 and transmit a control instruction to the controlled module 115, such that the controlled module performs an action corresponding to the touch control behavior of the user. The displaying module may be configured to indicate a touch control reference mark and a plurality of touch control response regions.

Figure 2:
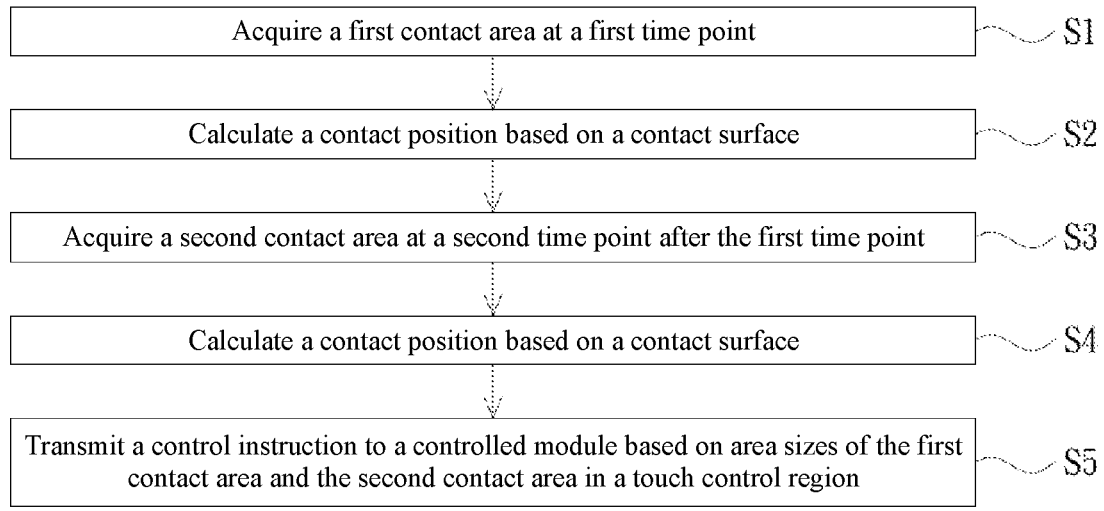
FIG. 2 is a flowchart of a touch control method/control program according to an embodiment of the present disclosure.

Then, referring to FIG. 2, FIG. 2 is a flowchart of a touch control method/control program according to an embodiment of the present disclosure. The touch control method/control program may include: acquire a first contact area at a first time point; acquire a second contact area at a second time point after the first time point; transmit a control instruction to a controlled module based on area sizes of the first contact area and the second contact area in a touch control region; and calculate a contact position based on a contact surface.

In this embodiment, as shown in FIG. 2, the touch control method/control program may include the following steps.

Step S1: A touch control sensing module 114 may calculate and acquire the first contact area at the first time point through a processing unit 111, and step S2 is then performed.

Step S2: The processing unit 111 may receive the first contact area and calculate a contact position based on a contact surface (a contact surface of the first contact area), and step S3 is then performed. For example, the touch control region may be regarded as an X-Y coordinate system, the processing unit 111 may perform average calculation on extreme coordinates $(X_{max}, Y_{max})$, $(X_{max}, Y_{min})$, $(X_{min}, Y_{max})$ and $(X_{min}, Y_{min})$ of X and Y of the contact surface in the coordinate axes respectively to obtain central coordinates $(X_{avg}, Y_{avg})$ of the contact surface, and the central coordinates are regarded as a center of a pressing position of the contact surface of the first contact area.

Step S3: The touch control sensing module 114 may calculate and acquire the second contact area at the second time point after the first time point through the processing unit 111, and step S4 is then performed.

Step S4: The processing unit 111 may receive the second contact area and calculate a contact position based on a contact surface (a contact surface of the second contact area), and step S5 is then performed. For example, the touch control region may be regarded as an X-Y coordinate system, the processing unit 111 may perform average calculation on extreme coordinates $(X_{max}, Y_{max})$, $(X_{max}, Y_{min})$, $(X_{min}, Y_{max})$ and $(X_{min}, Y_{min})$ of X and Y of the contact surface in the coordinate axes respectively to obtain central coordinates $(X_{avg}, Y_{avg})$ of the contact surface, and the central coordinates are regarded as a center of a pressing position of the contact surface of the second contact area.

Step S5: The control instruction is transmitted to the controlled module 115 based on area sizes of the first contact area and the second contact area in the touch control region.

In this embodiment, the touch control system 1 according to the present disclosure includes the touch control device 11. The touch control device 11 refers to a device that enables a user to conduct a touch control behavior, for example, touching the touch control sensing module with a finger to input the touch control behavior, and enables the controlled module 115 to perform the corresponding action. The touch control behavior may be, for example, finger swipe up, swipe down, swipe left, swipe right, touch and tap, etc. For example, the touch control device 11 may be a laptop, a tablet, a mobile phone, a touch pad, etc. The types of the touch control device 11 listed are only examples. The touch control device 11 is not limited to the types of devices listed, and all devices with the same function may be the touch control device 11 included in the touch control system 1.

In this embodiment, the touch control system 1 according to the present disclosure includes the processing unit 111. As a processing core of the touch control device 11, the processing unit 111 may be a logical circuit, a processor, a single-chip microcomputer and other devices with processing, calculation and timing capabilities. According to one embodiment, the processing unit 111 may also include the storage unit 112. The types of the processing unit 111 listed are only examples. The processing unit 111 is not limited to the types of devices listed, and all devices with the same function may be the processing unit 111 included in the touch control system 1.

In this embodiment, the touch control system 1 according to the present disclosure includes the storage unit 112. The storage unit 112 refers to a device that is connected to the processing unit 111 and configured to store the control program, a display program, an operating program, and other programs. According to one embodiment, the storage unit 112 stores the user interface (UI). The control program may include: acquire the first contact area at the first time point; acquire the second contact area at the second time point after the first time point; transmit the control instruction to the controlled module based on area sizes of the first contact area and the second contact area in the touch control region; calculate the contact position based on the contact surface; and transmit the control instruction based on the touch sequence of the plurality of touch control response regions. For example, the storage unit 112 may be a non-volatile memory, a memory card, a cache, or other devices with the same function. The types of storage devices listed are only examples, and the present disclosure is not limited herein. All storage devices with the same function may be used as the storage unit 112 of the present disclosure.

In this embodiment, the touch control system 1 according to the present disclosure includes the displaying module 113. The displaying module 113 may be configured to display/indicate the touch control reference mark and the plurality of touch control response regions. The touch control reference mark may be, for example, a reference point for an initial touch control position. For example, the displaying module 113 may display the touch control reference mark corresponding to a center position of the touch control region of the touch control sensing module 114, and the user may use the center position of the touch control region as the reference point for a starting position when implementing the touch control behavior, and swipe down after touching the position of the touch control reference mark with the finger to complete the action of finger swipe down of the touch control behavior. The displaying module 113 may display the user interface, and the touch control response regions may, for example, correspond to positions of virtual keys in the user interface. That is, when the user touches the touch control response regions, the touch control system 1 may transmit corresponding control instructions to the controlled module to cause the controlled module to make corresponding actions. The displaying module 113 may indicate the positions of the touch control response regions.

In this embodiment, the touch control system 1 according to the present disclosure includes the touch control sensing module 114. The touch control sensing module 114 includes the touch control region. The touch control region may include a plurality of sensing points and is configured to sample the touch control behavior of the user and acquire the contact area. A sampling method may be, for example, to sample the touch control behavior of the user by a capacitive sensor, an optical sensor, an ultrasonic sensor, etc. The types of the touch control sensing module 114 listed are only examples. The touch control sensing module 114 is not limited to the types of sensors listed, and all sensing devices with the same function may be used as the touch control sensing module 114 included in the touch control system 1.

In this embodiment, the touch control system 1 according to the present disclosure includes the controlled module 115. The controlled module 115 is configured to receive the control instruction from the processing unit 111, and perform the action corresponding to the touch control behavior based on the control instruction. For example, the controlled module 115 may be a speaker module in a mobile phone, and the processing unit 111 may send a control instruction for adjusting the volume level to the controlled module 115 corresponding to the touch control behavior (for example, swipe up and swipe down) of the user, so as to adjust the volume level of the mobile phone.

Figure 3:
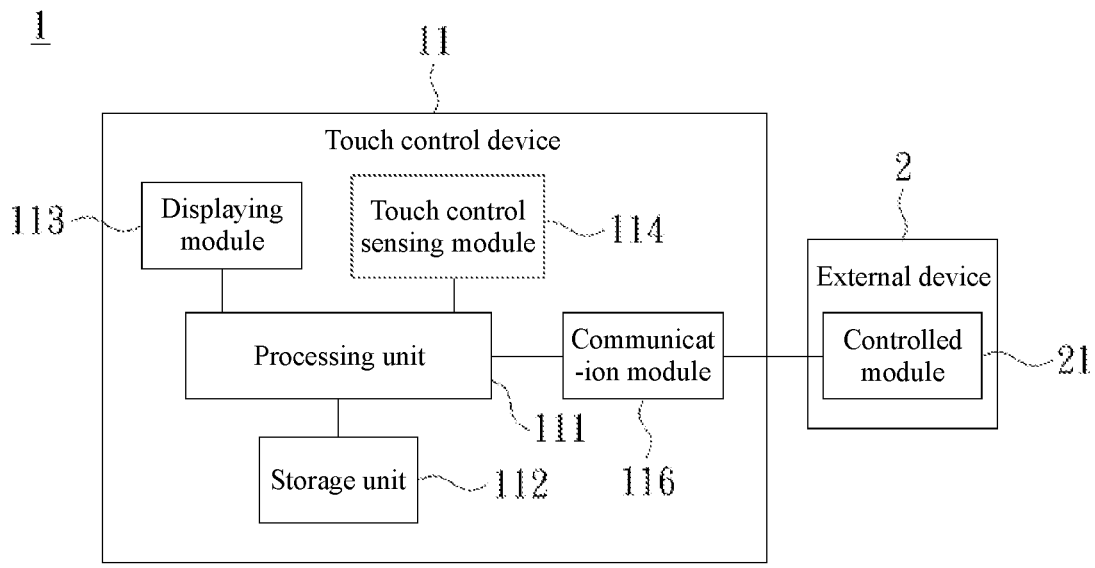
FIG. 3 is a block diagram of a touch control system according to another embodiment of the present disclosure.

Next, referring to FIG. 3, FIG. 3 is a block diagram of a touch control system 1 according to another embodiment of the present disclosure.

The present disclosure provides a plurality of implementations. The use of the same symbol for the components/devices means that the function of a component/device may also include the same function as the other embodiments, and therefore will not be repeated in the various embodiments of the present disclosure, and only the differences with other embodiments are described. The matters mentioned in the embodiments may be rearranged and combined as long as they do not cause conflict, and are applied to the embodiments. The present disclosure is not limited to the embodiments enumerated.

In this embodiment, the touch control system 1 according to the present disclosure includes a touch control device 11 and an external device 2. The touch control device 11 includes a processing unit 111, a storage unit 112, a displaying module 113, a touch control sensing module 114, and a communication module 116. The external device 2 includes a controlled module 21. The processing unit 111 is connected to the storage unit 112, the displaying module 113, the touch control sensing module 114, and the communication module 116. The communication module 116 is connected to the controlled module 21.

In this embodiment, the touch control system 1 according to the present disclosure includes the communication module 116 configured to be in communication connection with the controlled module. The communication connection may be a wireless communication connection, or a wired communication connection, which is not limited herein by the present disclosure.

In this embodiment, the touch control system 1 according to the present disclosure includes the external device 2, and the external device 2 includes the controlled module 21. For example, a user may use a touch panel (the touch control device 11) of a laptop computer to remotely control a Bluetooth headset (the external device 2), and adjust the volume level of the Bluetooth headset (the external device 2) by performing a touch control behavior on the touch panel.

The functional architecture of the present disclosure is described above, and the following is a description for the application of the present disclosure.

Figure 4:
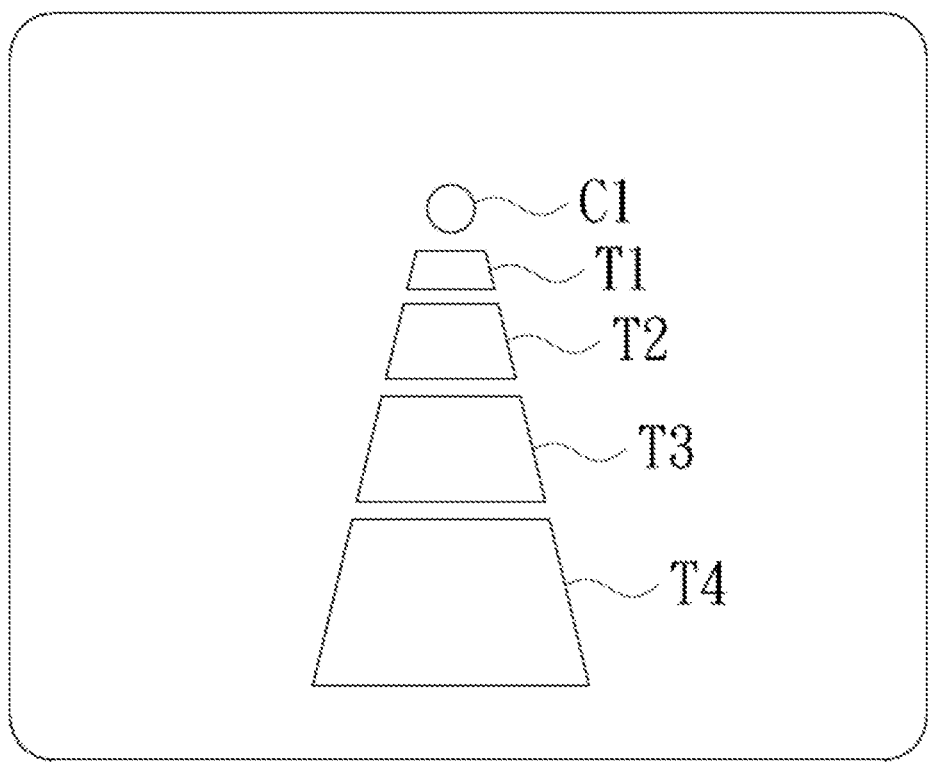
FIG. 4 is a schematic diagram of an application example according to an embodiment of the present disclosure.

Next, referring to FIG. 4, FIG. 4 is a schematic diagram of an application example according to an embodiment of the present disclosure.

FIG. 4 shows a touch control region and is used for explaining a touch control behavior performed by a user based on a touch control reference mark C1: finger swipe down. The touch control reference mark C1 may be set at any position within the touch control region. According to one embodiment, the touch control reference mark C1 may also not be set. Contact areas T1, T2, T3, and T4 are sequentially contact areas from early to late when a finger touches the touch control region and performs the touch control behavior. According to this example, the contact areas are shown as trapezoids. As shown in FIG. 4, when the finger of the user touches the touch control region, a contact surface may be formed between the finger and the touch control region. The contact area T1 is a contact area at the first time point, in which case, the contact area T1 is the minimum due to the lowest degree of completion of finger press. When the finger starts to swipe down, the contact area may gradually increase from the contact area T1 to the contact area T4 (that is, the contact area at the first time point may be smaller than the contact area at the second time point). The present disclosure may transmit the control instruction based on the contact areas T1 to T4. For example, compared with the case that the finger swipes down from the contact area T1 to the contact area T2, the controlled module may be provided with a larger drop when the finger swipes down from the contact area T1 to the contact area T3. In the case that the controlled module is a headset and the current volume is 100%, the volume may be decreased to, for example, 75% when the finger swipes down from the contact area T1 to the contact area T2, and the volume may be decreased to, for example, 50% when the finger swipes down from the contact area T1 to the contact area T3. Therefore, the present disclosure may transmit the control instruction based on area sizes of the first contact area and the second contact area in the touch control region to achieve the technical effect of rapid adjustment.

Figure 5:
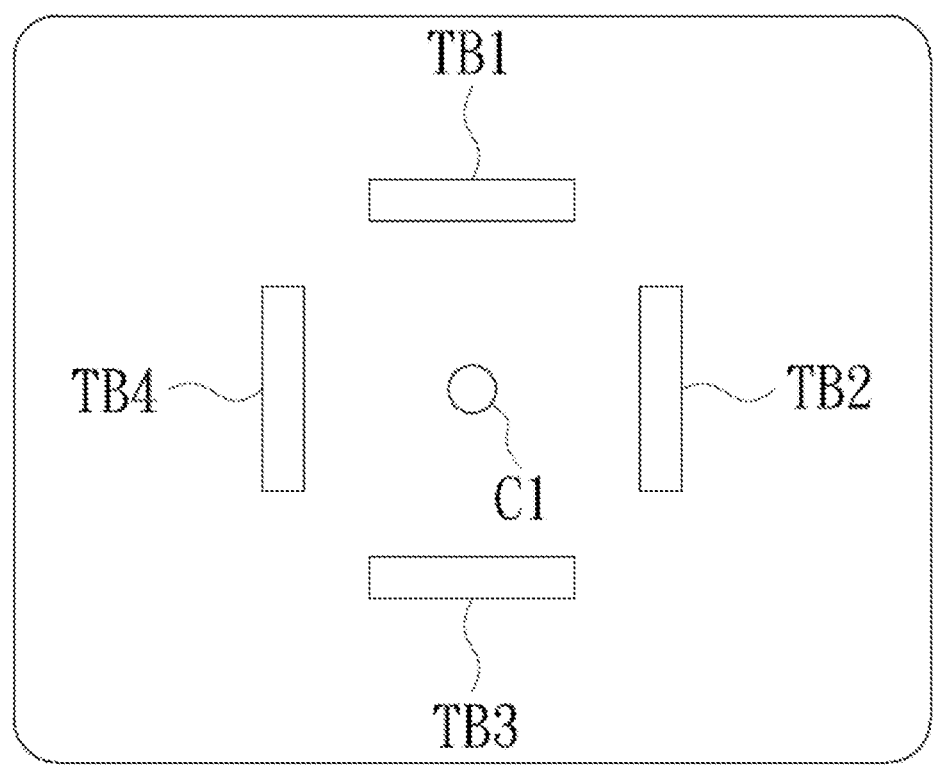
FIG. 5 is a schematic diagram of an application example according to another embodiment of the present disclosure.

Next, referring to FIG. 5, FIG. 5 is a schematic diagram of an application example according to another embodiment of the present disclosure.

FIG. 5 shows a touch control region and is used for explaining a touch control behavior of the user: rotation. Touch control response regions TB1, TB2, TB3, and TB4 are virtual keys of the user interface. The user may swipe the finger through the touch control response region TB1, the touch control response region TB2, the touch control response region TB3, and the touch control response region TB4 in sequence. In the case that the controlled module is a screen, the present disclosure may transmit a control instruction to cause the screen to rotate, for example, clockwise, based on a touch sequence of the touch control response regions. Thus, the present disclosure has the technical effect that complex operations such as screen rotation may be performed with only one finger.

In summary, as the touch control system and the touch control method according to the present disclosure may transmit the control instruction to the controlled module based on area sizes of the first contact area and the second contact area, under the condition that the area of the touch control region of the touch control system according to the present disclosure is fixed, the touch control response regions (for example, virtual keys) may be given more functional applications. Moreover, as repeated operations are not required, the present disclosure may effectively improve the use experience of users, and the users may use the touch control system quickly and efficiently and may perform various operations with a single finger.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A touch control system, comprising:
a touch control sensing module, comprising a plurality of touch control response regions and a touch control region, wherein the touch control region is configured to acquire a contact area, and the contact area comprises a first contact area and a second contact area; and
a processing unit, connected to the touch control sensing module and configured to execute a control program and transmit a control instruction to a controlled module,
wherein the control program comprises:
acquiring the first contact area at a first time point;
acquiring the second contact area at a second time point after the first time point;
transmitting the control instruction based on area sizes of the first contact area and the second contact area in the touch control region; and
transmitting the control instruction based on a touch sequence of the touch control response regions,
wherein the touch control response regions are virtual keys and the controlled module is a screen, the control instruction is transmitted to cause the screen to rotate by touching the touch control response regions in sequence.

2. The touch control system according to claim 1, further comprising:
a displaying module, connected to the processing unit and configured to indicate a touch control reference mark.

3. The touch control system according to claim 1, wherein the control program further comprises:
calculating a contact position based on a contact surface.

4. The touch control system according to claim 1, further comprising:
a displaying module, connected to the processing unit and configured to indicate the touch control response regions.

5. The touch control system according to claim 1, further comprising:
a communication module, connected to the processing unit and configured to be in communication connection with the controlled module.

6. A touch control method applicable to a touch control system, wherein the touch control system comprises a touch control sensing module, a processing unit, and a controlled module, and the touch control method comprises:
acquiring a first contact area at a first time point;
acquiring a second contact area at a second time point after the first time point;
transmitting a control instruction to the controlled module based on area sizes of the first contact area and the second contact area in a touch control region; and
transmitting the control instruction based on a touch sequence of a plurality of touch control response regions,
wherein the touch control response regions are virtual keys and the controlled module is a screen, the control instruction is transmitted to cause the screen to rotate by touching the touch control response regions in sequence.

7. The touch control method according to claim 6, wherein the touch control system further comprises:
a displaying module, connected to the processing unit and configured to indicate a touch control reference mark.

8. The touch control method according to claim 6, further comprising:
calculating a contact position based on a contact surface.

9. The touch control system according to claim 1, wherein the degree of control instruction is related to the size of the contact area.

10. The touch control system according to claim 1, wherein the control instruction is to cause the screen to rotate based on a touch sequence of the touch control response regions.

11. The touch control system according to claim 1, wherein the area size of the contact area in the touch control region is related to the control instruction to control the sound volume.

12. The touch control method according to claim 6, wherein the degree of control instruction is related to the size of the contact area.

13. The touch control method according to claim 6, wherein the control instruction is to cause the screen to rotate based on a touch sequence of the touch control response regions.

14. The touch control method according to claim 6, wherein the area size of the contact area in the touch control region is related to the control instruction to control the sound volume.

* * * * *